United States Patent Office 3,748,182
Patented July 24, 1973

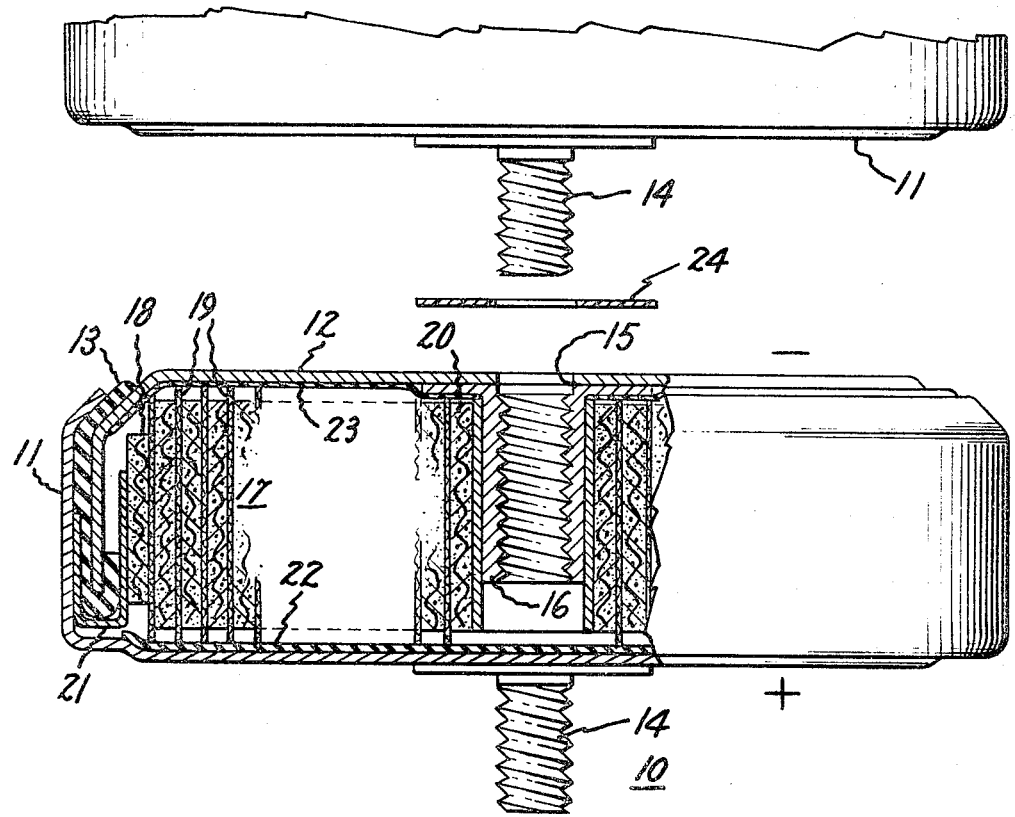

3,748,182
BUTTON TYPE CELL CASING AND SEALED
BUTTON TYPE BATTERY
James E. Brown, Schenectady, N.Y., assignor to General
Electric Company, Schenectady, N.Y.
Filed May 26, 1972, Ser. No. 257,309
Int. Cl. H01m 21/00
U.S. Cl. 136—111          8 Claims

ABSTRACT OF THE DISCLOSURE

A cell casing for a primary dry cell battery of the button type is disclosed which includes a case with a first elongated electrically conductive member affixed centrally to its exterior surface, and a cover with a second elongated electrically conductive hollow member affixed centrally to its interior surface in communication with an aperture. Both a single and a multi-cell battery are described which include the above battery casing.

---

This invention relates to cell casings and to sealed batteries and, more particularly, to such cell casings and to such batteries of the sealed button type.

Rechargeable sealed secondary batteries of the button type are available commercially. Such a battery includes a case and a cover of electrically conductive material which are spaced apart by electrical insulation. An electrode assembly is positioned within the cover casing. Tabs or leads affixed internally to both the case and cover are electrically connected to the respective electrodes. If a voltage is desired which is larger than that of an individual cell, a number of these cells are connected together electrically by means of externally connected tabs. Such an assembly of more than one cell is referred to as a cell stack. The stacking of cells entails filling each through its fill hole with electrolyte, sealing this fill hole, spot welding the external cell tabs, and aligning the stack by means of a jig. However, such a procedure is time consuming and results in problems associated with seal leaks, welding the associated tabs, and accurately aligning the cells in the stack.

My present invention is directed to a button type cell casing and a sealed button type primary battery which overcome the above problems by providing leak-tight seals, rapid electrical connection between cells, and accurate cell alignment.

The primary objects of my invention are to provide an improved button type cell casing and a sealed button type primary cell which can be sealed effectively and connected and stacked accurately with others to produce a multi-cell battery of any desired voltage.

In accordance with one aspect of my invention, a sealed button type primary cell includes a case with a first elongated electrically conductive member affixed centrally to its exterior surface, a cover with a second elongated electrically conductive hollow member affixed to its interior surface in communication with a centrally disposed cover aperture, and a spirally wound assembly of cathode, separator with electrolyte and anode.

These and various other objects, features and advantages of the invention will be better understood from the following description taken in connection with the accompanying drawing in which:

The single figure is a sectional view of a sealed button type primary cell including a button type cell casing made in accordance with my invention.

In the single figure of the drawing, there is shown generally at 10 a sealed button type primary cell including a button type cell casing embodying my invention. Cell 10 has a case 11 and a cover 12 each made of electrically conductive material forming spaced apart negative and positive terminal walls. Electrical leads from the respective cover and casing are not shown. Case 11 and cover 12 are insulated electrically from each other by an electrically insulating gasket 13 which provides a leak-tight seal therebetween. A first elongated electrically conductive member 14 in the preferred form of a threaded stud is affixed centrally as by welding to the exterior surface of case 11. Cover 12 has a central aperture 15 therein. A second elongated electrically conductive hollow member 16 in the preferred form of an internally tapped and threaded stud is affixed as by welding to the interior surface of cover 12 and in communication with aperture 15. A spiral wound assembly 17 of cathode 18, separator 19 with electrolyte, and anode 20, is positioned within case 11 and cover 12. A metallic connecting strip 21 contacts cathode 18 and the interior surface of case 11. Assembly 17 is otherwise insulated electrically from case 11 by an electrically insulating washer 22. Assembly 17 is insulated electrically from cover 12 by an electrically insulating washer 23. Hollow member 16 is in electrical contact with anode 20. Separator 19 can be impregnated with electrolyte prior to assembling the cell. However, it is preferred to assemble the cell and then impregnate the separator with electrolyte through the cover aperture. The aperture would then be sealed by means of an epoxy resin, welding, or a threaded bolt with gasket.

However, the advantage of the present invention is more fully derived from stacking accurately a number of the cells to produce a battery of desired voltage, eliminating electrolyte leakage, and assuring good electrical connection among the multiple cells.

With further reference to the single figure of the drawing, there is shown a portion of a second sealed button type cell with a case 11 and its associated elongated electrically-conductive member 14 positioned above first cell 10. A liquid impervious washer of a tetrafluoroethylene polymer is shown positioned on member 14 of the partially shown second cell. Second cell member 14 in the form of a threaded stud is threaded into tapped and threaded stud 16 of first cell 10. This threading is normally accomplished after first cell 10 has been filled with electrolyte through aperture 15. In this manner, washer 24 is compressed between cover 12 of the first cell and the head of the stud affixed to cover 11 of the second cell. Additional cells are threaded together to form a plurality of cells to produce the desired battery.

The sealed button type primary cell of this invention employs preferably a spirally wound assembly of a mercuric oxide cathode, a thin, polymer film electrode separator with a potassium hydroxide-cesium hydroxide mixed electrolyte, and a sponge cadmium metal anode. Various methods of forming the assembly are suitable. Other cathode, anode, separator and electrolyte materials can be employed.

Examples of button type cell casings and sealed button type primary batteries made in accordance with my invention are set forth below:

EXAMPLE I

A button type cell casing was formed generally in accordance with the above description and with the single figure of the drawing. A casing and associated cover were provided, each of which was made of electrically conductive nickel-plated steel. A #2–56 weld head screw was welded to the outside center of the casing. A second weld head screw had a #2–56 hole tapped therethrough. The second screw was welded to the interior surface of the cover to communicate with the cover aperture. An electrically insulating washer of polyethylene polymer was provided between the casing and cover. The resulting structure was a button type cell casing.

EXAMPLE II

The button type cell casing of Example I was employed to form a primary battery. A spirally wound assembly of mercuric oxide cathode, polyethylene-polypropylene copolymer ion-exchange film separator, and cadmium anode was inserted in the casing and insulated from the case and cover by a pair of separator washers of polytetrafluoroethylene polymer. A nickel strip was welded to the cathode and was in contact with the case. The cover was positioned on and within the case with a washer of polyethylene polymer therebetween as electrical insulation. The cell was vacuum filled with 31 w/o potassium hydroxide electrolyte through the cover aperture. The aperture was then sealed by means of a short #2–56 round-head machine screw and a 10-mil thick polytetrafluoroethylene polymer gasket. The resulting structure was a sealed, button type primary battery with an open circuit voltage of 0.92 volt.

EXAMPLE III

Fifteen button type cell casings were prepared in accordance with Example I. Each cell was assembled as in Example II except that the machine screw was not used. The casing member of each cell was instead threaded into the hollow member of the associated cover of the adjacent cell. The hollow member of the last cover was sealed with a threaded screw as in Example II. The resulting device was a stack of sealed button cells in the form of a cylindrical battery.

EXAMPLE IV

The cell assembly of Example III exhibited an open circuit voltage of 13.6 volts. This battery exhibited the following performance which is shown in Table I.

TABLE I

| Current, milliamperes | Potential, volts | | |
|---|---|---|---|
| | −50° C. | +25° C. | +74° C. |
| 0 | 13.3 | 13.6 | 13.6 |
| 55 | 10.4 | 13.0 | 13.1 |
| 102 | 10.1 | 12.8 | 12.9 |

While other modifications of the invention and variations thereof, which may be employed within the scope of the invention have not been described, the invention is intended to include such as may be embraced within the following claims.

What I claim as new and desire to secure by Letters Patent of the United States is:

1. A button type cell casing which comprises a case and cover each made of electrical conductive material forming spaced apart positive and negative terminals for a cell, the case and cover insulated electrically from each other, a first elongated, electrically conductive member affixed centrally to the exterior surface of the case, the cover having a centrally disposed aperture therein, and a second elongated electrically conductive hollow member affixed to the interior surface of the cover and in communication with the aperture in the cover.

2. A button type cell casing as in claim 1, in which the first member is a threaded stud, and the second member is an internally tapped and threaded stud.

3. A sealed button type primary cell which comprises a case and cover each made of electrical conductive material forming spaced apart positive and negative terminals for the cell, the case and cover insulated electrically from each other, a first elongated, electrically conductive member affixed centrally to the exterior surface of the case, the cover having a centrally disposed aperture therein, a second elongated electrically conductive hollow member affixed to the interior surface of the cover and in communication with the aperture in the cover, a seal for the hollow member, a spirally wound assembly of cathode, separator with electrolyte and anode within the cell, and the cathode and anode connected respectively to its associated cover and case.

4. A sealed button type cell as in claim 3, in which the first member is a threaded stud, and the second member is an internally tapped and threaded stud.

5. A sealed button type primary cell as in claim 3, in which the cathode is mercuric oxide, and the anode is cadmium metal.

6. A sealed, multi-cell primary battery as in claim 3, in which a plurality of cells are assembled together by positioning each casing member into an associated cover member and a liquid impervious washer is positioned on each casing member thereby retaining electrolyte in each cell.

7. A sealed multi-cell primary battery as in claim 6, in which the plurality of cells are assembled together by threaded each casing stud into an associated cover tapped and threaded stud, and a liquid impervious washer is positioned on each casing stud thereby retaining electrolyte in each battery.

8. A sealed, multi-cell primary battery as in claim 7, in which the cathode is mercuric oxide, and the anode is cadmium metal.

References Cited
UNITED STATES PATENTS 3,310,436 3/1967 Ralston et al. _____ 136—109 X
3,440,110 4/1969 Arbter _____ 136—166

ANTHONY SKAPARS, Primary Examiner